United States Patent
Komagata

(10) Patent No.: US 7,663,660 B2
(45) Date of Patent: Feb. 16, 2010

(54) IMAGE DISPLAY SYSTEM AND IMAGE PROCESSING DEVICE

(75) Inventor: Yoshinobu Komagata, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 816 days.

(21) Appl. No.: 10/975,820

(22) Filed: Oct. 29, 2004

(65) Prior Publication Data

US 2005/0280650 A1 Dec. 22, 2005

(30) Foreign Application Priority Data

Jun. 18, 2004 (JP) ............................. 2004-181173

(51) Int. Cl.
*H04N 13/00* (2006.01)
*G06T 15/20* (2006.01)

(52) U.S. Cl. ........................................ 348/42; 345/427

(58) Field of Classification Search .................. 345/427; 348/42

See application file for complete search history.

(56) References Cited

U.S. PATENT DOCUMENTS 5,625,764 A * 4/1997 Tsujimoto et al. ........... 345/640
5,896,128 A * 4/1999 Boyer ......................... 715/716
6,570,566 B1 * 5/2003 Yoshigahara ................ 345/427

FOREIGN PATENT DOCUMENTS

| JP | 04-054080 | 2/1992 |
|----|-----------|--------|
| JP | 07-255021 | 10/1995 |
| JP | 07-298245 | 11/1995 |
| JP | 10-133636 | 5/1998 |

* cited by examiner

*Primary Examiner*—Tung Vo
*Assistant Examiner*—Anner Holder
(74) *Attorney, Agent, or Firm*—Fujitsu Patent Center

(57) ABSTRACT

A read unit reads a plurality of pieces of image data from an image storing unit for output, respectively. A destination specifying unit specifies image display units to be display destinations of the image data from the read unit. A divided-period setting unit divides a unit display period of the image display units to a plurality (2) of divided periods to correspond to the image display units. In each divided period, a synthesis unit synthesizes, for sequential outputs, the image data from the read units according to the display destination specified by the destination specifying unit in order to multiplex the image data to be displayed on each of the image display units. A separating unit separates, in every divided period of the unit display period, the synthesized image data for output to the image display units corresponding to the respective divided periods.

16 Claims, 18 Drawing Sheets

IMAGE DISPLAY SYSTEM AND IMAGE PROCESSING DEVICE

CROSS REFERENCE TO RELATED APPLICATION

This application is based upon and claims the benefit of priority from Japanese Patent Application No. 2004-181173, filed on Jun. 18, 2004, the entire contents of which are incorporated herein by reference.

BACKGROUND OF THE INVENTION

1. Field of the Invention

The present invention relates to an image display system and an image processing device, and more particularly, to an image display system that displays different images on a plurality of display devices (display screens) and to an image processing device used in the image display system.

2. Description of the Related Art

In an electronic device (image display system) having a graphics display function such as a car navigation system and a portable game machine, a plurality of virtual sheets called layers to place images thereon are superposed or changed in order to add some element to or to change an image on a display device. Japanese Unexamined Patent Application Publication No. 2003-288071, for example, has disclosed an image processing device which reads a plurality of pieces of image data from a memory and synthesizes the read image data in a predetermined order for output, and an image display system using this image processing device.

In configuring an image display system that displays different images on, for example, two display devices by use of the conventional image processing device, the image display system need to include two sets of an image processing device including a circuit for reading image data from memories and a circuit for synthesizing the read image data, and memories for storing the image data, in association with the two display devices. This greatly increases the scale of the image display system as well as the manufacturing cost.

SUMMARY OF THE INVENTION

It is an object of the present invention to display different images on a plurality of display devices without any increase in the scale of an image display system.

According to one of the aspects of the present invention, an image display system includes a plurality N of image display units, an image storing unit, a read unit, a destination specifying unit, a divided-period setting unit, a synthesis unit, and a separating unit. For example, the read unit, the destination specifying unit, the divided-period setting unit, and the synthesis unit constitute an image processing device. The image storing unit stores therein a plurality of pieces of image data. The read unit reads each of the plural pieces of image data from the image storing unit for output. The destination specifying unit specifies the image display unit to be a display destination of each of the plural pieces of image data outputted from the read unit. The divided-period setting unit divides a unit display period of the image display units to N divided periods to correspond to the image display units, respectively. In each of the divided periods set by the divided-period setting unit, the synthesis unit synthesizes, for sequential outputs, the image data from the read unit according to the display destination by the destination specifying unit, in order to multiplex the image data to be displayed on each of the image display units. During the unit display period, the separating unit separates the image data outputted from the synthesis unit in each of the divided periods and outputs the separated image data to the respective image display units corresponding to the divided periods.

In the image display system as configured above, the image data are multiplexed in each unit display period of the image display units for display on each of the image display units by synthesizing the image data outputted from the read unit in each of the divided periods according to the display destination specified by the destination specifying unit. Therefore, unlike the case where the conventional image processing device is used, the image display system need not include a plurality of sets of a circuit for image data read from an image storing unit, a circuit for synthesizing the read image data (image processing device), and an image storing unit, in association with a plurality of image display units. This enables the display of different images on the plurality of image display units without any increase in the scale of the image display system. As a result, it is able to reduce the manufacturing cost of the image display system.

In addition, for the image processing device having the read unit, the destination specifying unit, the divided-period setting unit, and the synthesis unit, for example, it is easy to separate image data outputted from the synthesis unit for each of the image display units because Image data is separately outputted in each of the divided periods within the unit display period of the image display units for display thereon. Besides, this image processing device multiplexes the image data to be displayed on the respective image display units, so that it is able to output the image data without any increase in the number of output terminals for the image data. This can contribute to a reduction in the manufacturing cost of the image display system.

In a preferable example of the aforesaid aspect of the present invention, a plurality of read circuits in the read unit correspond to the plurality of pieces of image data stored in the image storing unit respectively. Each of the read circuits reads a corresponding piece of image data and outputs the read piece together with an image validity signal indicating validity/invalidity of the image data. The destination specifying unit outputs, for each of the plural pieces of the image data outputted from the plural read circuits, a destination signal that indicates an image display unit to be a display destination. The divided-period setting unit outputs a divided-period signal indicating a current divided period. A plurality of mask circuits in the synthesis unit correspond to the plural read circuits, respectively. In accordance with a corresponding destination signal and the divided-period signal, each of the mask circuits masks the image validity signal from its corresponding read circuit during a period which excludes a divided period corresponding to an image display unit to display image data from the corresponding read circuit. A plurality of synthesis circuits in the synthesis unit are connected in series, corresponding to the plural mask circuits respectively. Each of the synthesis circuits selects, for output, image data outputted from its corresponding read circuit when the image validity signal masked by its corresponding mask circuit indicates validity, while selecting, for output, image data outputted from a preceding stage when the image validity signal masked by the corresponding mask circuit indicates invalidity. The read unit and the synthesis unit can be easily formed as described above.

In a preferable example of the aforesaid aspect of the present invention, the destination specifying unit has, for each of the plural pieces of image data from the plural read circuits, N bits in association with the respective image display units, and outputs each bit value of the N bits as the destination signal. This makes it possible to constitute the destination specifying unit with a simple circuitry.

In a preferable example of the aforesaid aspect of the present invention, the number N of the image display units is 2. The destination specifying unit has, for each of the plural pieces of the image data from the plural read circuits, a bit in association with one of the two image display units and outputs a bit value and an inverse value of the bit as the destination signal. Compared with a case where the destination specifying unit has, for each of the plural pieces of the image data from the plural read circuits, two bits in association with the two image display units, the number of bits can be halved if the image data outputted from each of the read circuits need not be displayed on both of the image display units. Accordingly, it is possible to reduce the circuit scale of the destination specifying unit.

In a preferable example of the aforesaid aspect of the present invention, a video image supply unit outputs image data to form a video image in sequence. A write unit writes to the image storing unit the image data sequentially outputted from the video image supply unit. The write unit continuously rewrites the image data in the image storing unit, so as to display the video image on the image display units. With application of the image display system thus configured to, for example, a car navigation system having display screens on a driver's seat side and a rear seat side of a car, it is possible to display images relating to route guidance on the display screen on the driver's seat side and to display video images (DVD playback images, images received from television broadcast, or the like) on the display screen on the rear seat side at the same time.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
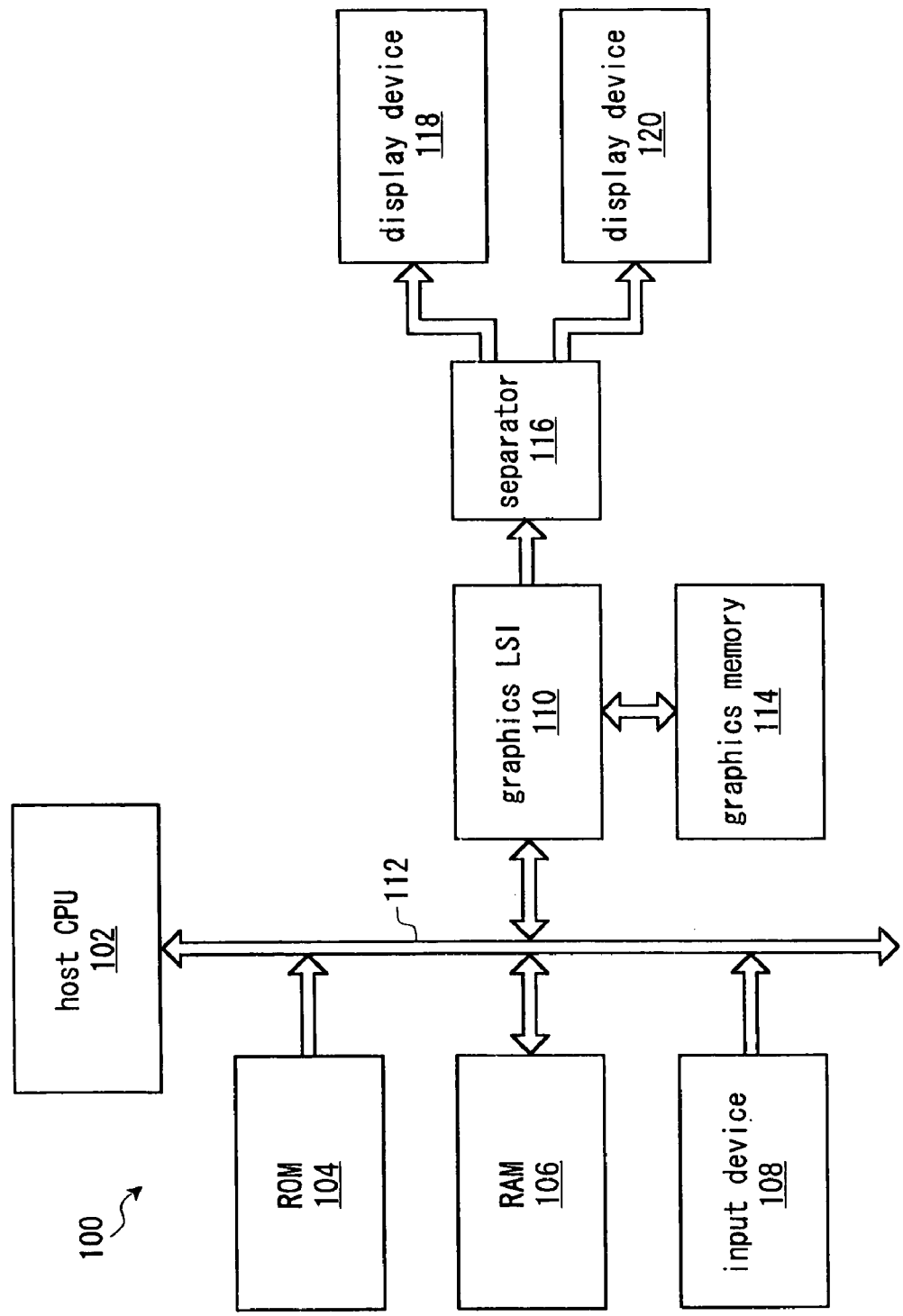
FIG. 1 is a block diagram showing a first embodiment of the present invention.

Hereinafter, embodiments of the present invention will be described with reference to the drawings. FIG. 1 shows a first embodiment of the present invention. An image display system 100 (graphics display system) adopting a raster scan method has a host CPU 102, a ROM 104, a RAM 106, an input device 108, a graphics LSI 110 (image processing device), a bus 112, a graphics memory 114 (image storing unit), a separator 116 (separating unit), and display devices 118, 120 (image display units). The host CPU 102 controls each unit according to programs stored in the ROM 104 or the RAM 106 and processes various arithmetic operations. The ROM 104 stores the programs to be executed by the host CPU 102 and various kinds of data. The RAM 106 tentatively stores the programs to be executed by the host CPU 102 and various kinds of data. The input device 108 is constituted of, for example, a pointing device, and generates and outputs data according to a user's operation.

The graphics LSI 1110 reads image data from the graphics memory 114 and appropriately synthesizes the read image data for output to the separator 116. The graphics LSI 110 will be described in detail in FIG. 2. The bus 112 connects the host CPU 102, the ROM 104, the RAM 106, the input device 108, and the graphics LSI 110 to one another to enable data exchange thereamong. Image data are written to the graphics memory 114 by the host CPU 102 via the graphics LSI 110. Further, the graphics memory 114 outputs image data to the graphics LSI 110 in response to a request from the graphics LSI 110.

The separator 116 separates the image data outputted from the graphics LSI 110 into image data to be displayed on the display device 118 and image data to be displayed on the display device 120 and outputs the respective image data to the display devices 118, 120. The separator 116 will be described in detail together with the graphics LSI 110 in FIG. 2. The display devices 118, 120, each constituted of, for example, an LCD (Liquid Crystal Display), display the image data outputted from the separator 116.

Figure 2:
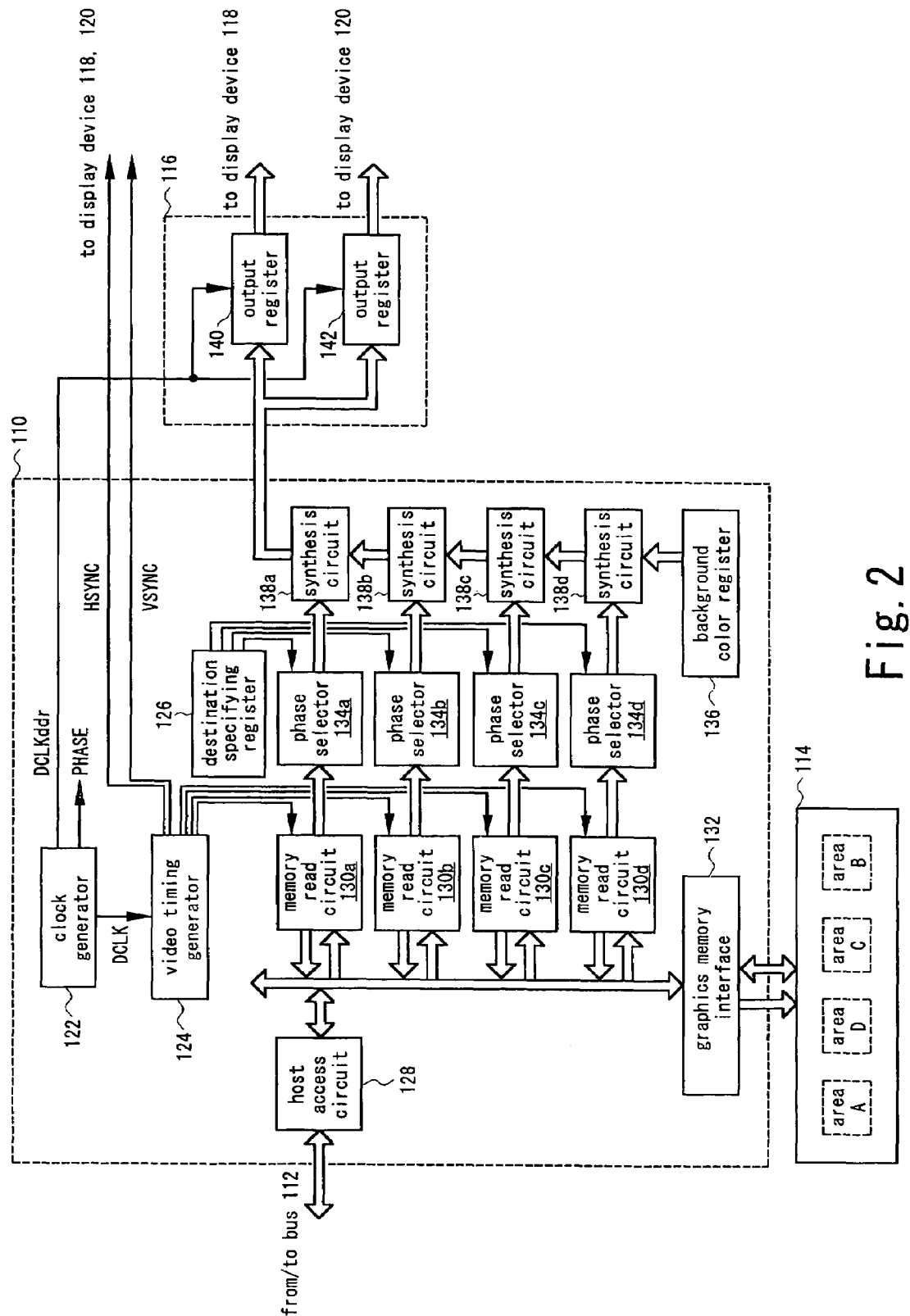
FIG. 2 is a block diagram showing a graphics LSI and a separator in FIG. 1.
Figure 3:
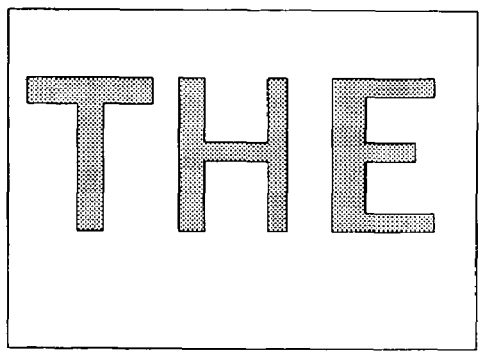
FIGS. 3(a) to (d) show examples of image data stored in a graphics memory in FIG. 2.
Figure 3:
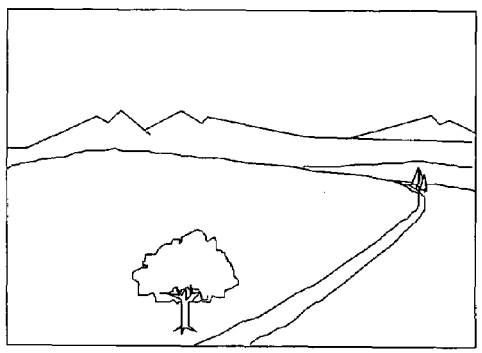
Figure 3:
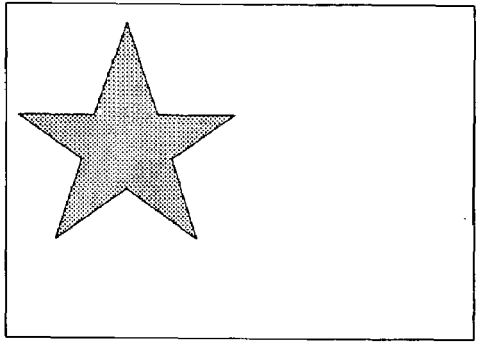
Figure 3:
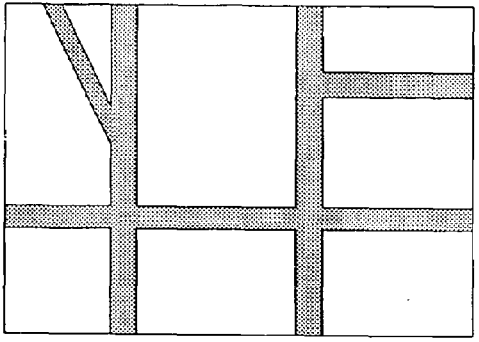
Figure 4:
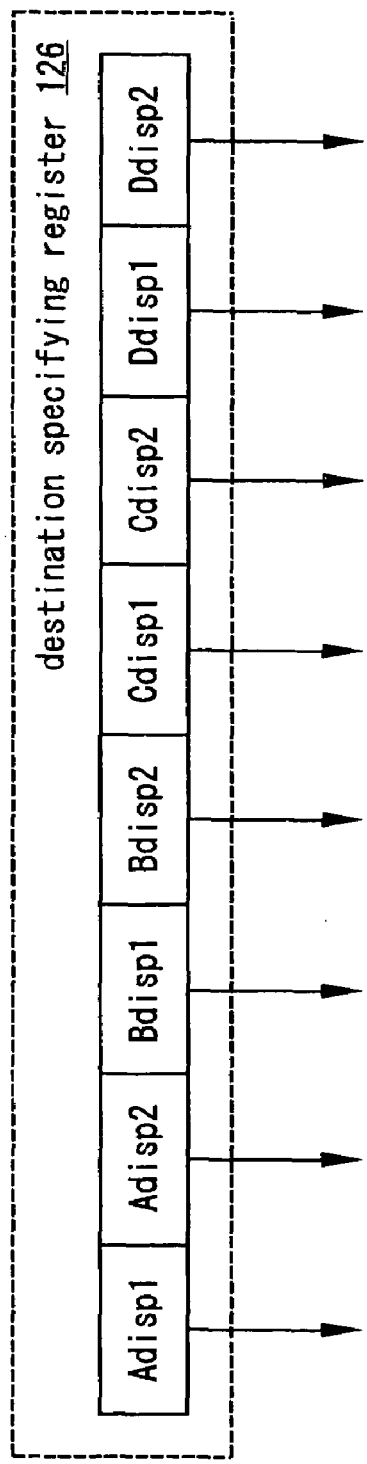
FIG. 4 shows the register structure of a destination specifying register in FIG. 2.
Figure 5:
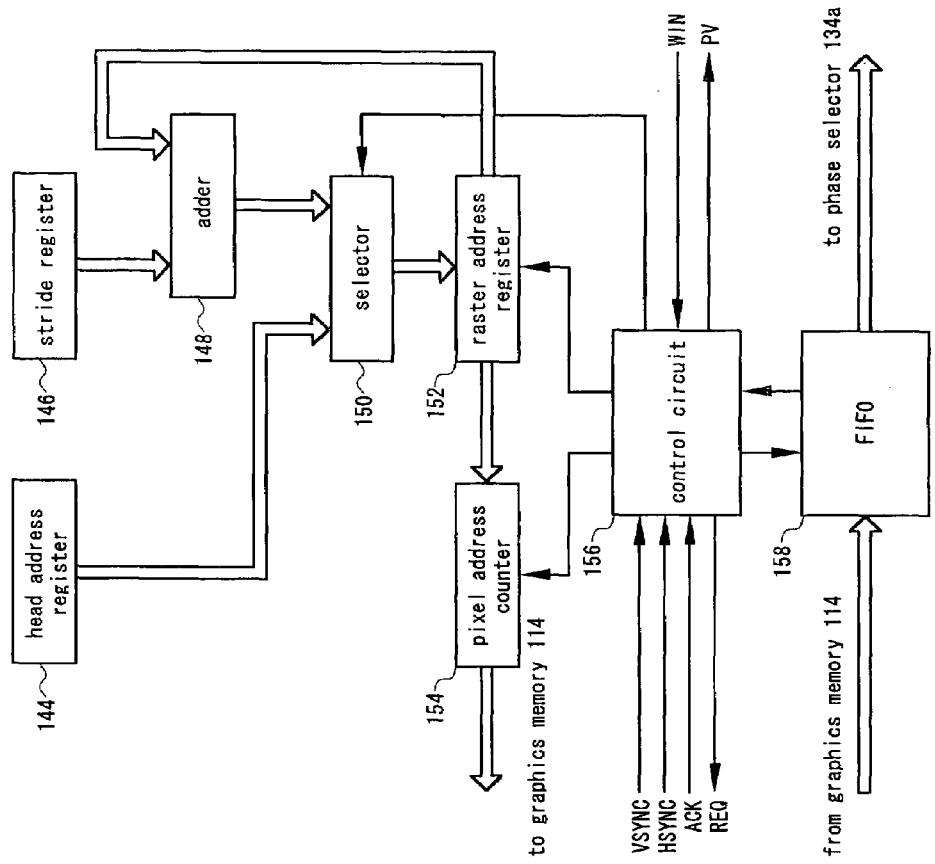
FIG. 5 is a block diagram showing a memory read circuit in FIG. 2.
Figure 6:
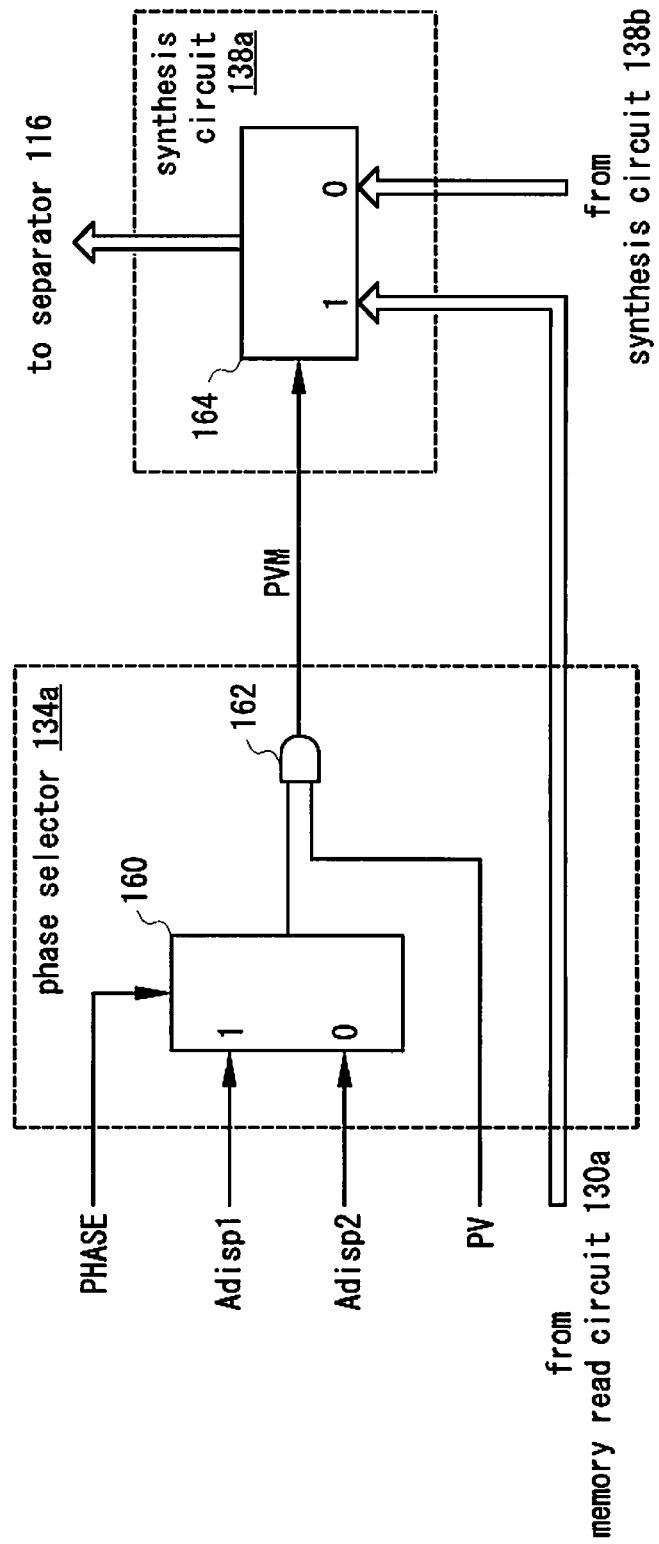
FIG. 6 is a block diagram showing a phase selector and a synthesis circuit in FIG. 2.

FIG. 2 shows the graphics LSI 110 and the separator 116 in FIG. 1. FIGS. 3(a) to (d) show examples of image data stored in the graphics memory 114 in FIG. 2. FIG. 4 shows the structure of a destination specifying register 126 in FIG. 2. FIG. 5 shows a memory read circuit 130a in FIG. 2. FIG. 6 shows a phase selector 134a and a synthesis circuit 138a in FIG. 2.

Image data, for example, shown in FIGS. 3(a) to (d) are stored in areas A to D of the graphics memory 114, respectively. The graphics LSI 110 has a clock generator 122 (divided-period setting unit), a video timing generator 124, the destination specifying register 126 (destination specifying unit), a host access circuit 128, memory read circuits 130a to 130d (read unit), a graphics memory interface 132, phase selectors 134a to 134d (mask circuit, synthesis unit), a background color register 136, and synthesis circuits 138a to 138d (synthesis unit).

Using, for example, a PLL circuit and a programmable divider (not shown), the clock generator 122 generates a clock DCLK for determining an image output speed of the graphics LSI 110 to output it to the video timing generator 124. Specifically, a period of the clock DCLK corresponds to a display period for one pixel on the display devices 118, 120 (unit display period). The clock generator 122 outputs to the phase selectors 134a to 134d a phase signal PHASE (divided-period signal) that varies in synchronization with transition edges of the clock DCLK. A period between rising edges (or falling edges) of the phase signal PHASE corresponds to the display period for one pixel on the display devices 118, 120. Therefore, the display period for one pixel on the display devices 118, 120 consists of two periods, namely, one during which the phase signal PHASE indicates "1" and the other one during which the phase signal PHASE indicates "0". The clock generator 122 also generates a clock DCLKddr whose frequency is the same as that of the clock DCLK and outputs the clock DCLKddr to the separator 116.

In accordance with the clock DCLK from the clock generator 122, the video timing generator 124 generates a vertical synchronizing signal VSYNC, a horizontal synchronizing signal HSYN, and other additional signals that are generally necessary for image display. The destination specifying register 126 is a register for specifying display destinations (display devices 118, 120) of the image data stored in the respective areas A to D of the graphics memory 114, and a register value thereof can be set by the host CPU 102 via the bus 112.

For example, as shown in FIG. 4, the destination specifying register 126 is an 8-bit register having bits Adisp1, Adisp2 corresponding to the area A of the graphics memory 114, bits Bdisp1, Bdisp2 corresponding to the area B, bits Cdisp1, Cdisp2 corresponding to the area C, and bits Ddisp1, Ddisp2 corresponding to the area D. It outputs bit values thereof to the phase selectors 134a to 134d as destination signals Adisp1 and Adisp2, destination signals Bdisp1 and Bdisp2, destination signals Cdisp1 and Cdisp2, and destination signals Ddisp1 and Ddisp2, respectively. For example, when the image data in the area A of the graphics memory 114 is to be displayed only on the display device 118, the bits Adisp1, Adisp2 are set to "1" and "0" respectively. When the image data in the area A of the graphics memory 114 is to be displayed only on the display unit 120, the bits Adisp1, Adisp2 are set to "0" and "1" respectively. When the image data in the area A of the graphics memory 114 is to be displayed both on the display devices 118, 120, the bits Adisp1, Adisp2 are both set to "1". The same relation applies to between the area B of the graphics memory 114 and the bits Bdisp1, Bdisp2 of the destination specifying register 126, between the area C and the bits Cdisp1, Cdisp2, and between the area D and the bits Ddisp1, Ddisp2.

In FIG. 2, the host access circuit 128 is a circuit via which the host CPU 102 accesses the graphics memory 114 and it is mainly used in writing the image data to be displayed on the display devices 118, 120 to the graphics memory 114. The memory read circuits 130a to 130d read the image data of respective layers (the areas A to D) from the graphics memory 114 via the graphics memory interface 132, tentatively store the read image data through high-speed burst transfer, and output the stored image data at a timing appropriate for image display.

For example, as shown in FIG. 5, the memory read circuit 130a has a head address register 144, a stride register 146, an adder 148, a selector 150, a raster address register 152, a pixel address counter 154, a control circuit 156, and a FIFO (First In First Out) 158. The head address register 144 is a register whose register value is set by the host CPU 102 via the bus 112 shown in FIG. 1, and it holds a head address of the area A storing the image data to be displayed. The stride register 146 is a register whose register value is set by the host CPU 102 via the bus 112 and it holds a constant value to be added at the time of address calculation of a subsequent raster.

The adder 148 adds the register value of the stride register 146 and a register value of the raster address register 152 to output the resultant to the selector 150. The selector 150 selects an output of the head address register 144 when reading the head of the area A, while in other cases, selecting an output of the adder 148 to output it to the raster address register 152. The raster address register 152 is a register holding a head address of each raster to be displayed and being loaded with the register value of the head address register 144 in synchronization with the vertical synchronizing signal VSYNC outputted from the video timing generator 124 shown in FIG. 2. Further, the register value of the stride register 146 is added to that of the raster address register 152 in synchronization with the horizontal synchronizing signal HSYNC outputted from the video timing generator 124 shown in FIG. 2.

The pixel address counter 154 calculates an address of each pixel forming a raster. The pixel address counter 154 loads the head address of the raster from the raster address register 152 in synchronization with the horizontal synchronizing signal HSYNC. Then, the pixel address counter 154 increments a value thereof by one each time. This counter value of the pixel address counter 154 is an address output to be outputted to the graphics memory 114. The control circuit 156 outputs an access request signal REQ to the graphics memory interface 132 according to the vertical synchronizing signal VSYNC, the horizontal synchronizing signal HSYNC, and the state of the FIFO 158, and receives an access acknowledgement signal ACK as a response therefrom. The control circuit 156 outputs an image validity signal PV according to a window signal WIN outputted from the video timing generator 124 and indicating the display timing for images on the display devices 118, 120. The image validity signal PV is activated to "1" from "0" when the image data outputted from the memory read circuit 130a is image data to be displayed on the display device 118 or 120. Further, the control circuit 156 controls the selector 150, the raster address register 152, and the pixel address counter 154.

The FIFO 158 stores the image data read from the graphics memory 114 in sequence and reads and outputs the image data in the order of the storage. The data read from the graphics memory 114 are transferred in a high-speed burst transfer mode but this transfer is performed only intermittently. Therefore, displaying the read data as they are would result in discontinuous image display. So, the read data are tentatively stored in the FIFO 158 to be outputted at a timing synchronous with the image display. Note that the memory read circuits 130b to 130d also have the same configuration as that of the memory read circuit 130a.

In FIG. 2, the graphics memory interface 132 arbitrates access (read or write) requests from the memory read circuits 130a to 130d and the host access circuit 128, permitting the requests one by one to have them access to the graphics memory 114. The phase selectors 134a to 134d mask the image validity signals PV outputted from the memory read circuits 130a to 130d. The background color register 136 holds codes of background colors to output the codes to the synthesis circuit 138d. The synthesis circuits 138a to 138d are connected in cascade. Each of the synthesis circuits 138a to 138d appropriately synthesizes the image data outputted from a corresponding one of the memory read circuits 130a to 130d and the image data outputted from a preceding stage (the synthesis circuits 138b to 138d and the background color register 136) to output the resultant image data.

For example, as shown in FIG. 6, the phase selector 134a has a selector 160 and an AND circuit 162. The selector 160 outputs to the AND circuit 162 the destination signal Adisp1 outputted from the destination specifying register 126 shown in FIG. 2 when the phase signal PHASE outputted from the clock generator 122 shown in FIG. 2 indicates "1". The selector 160 outputs the destination signal Adisp2 to the AND circuit 162 when the phase signal PHASE indicates "0". The AND circuit 162 outputs to the synthesis circuit 138a the image validity signal PV, which is outputted from the memory read circuit 130a, as an image validity signal PVM when the output signal of the selector 160 indicates "1". The AND circuit 162 fixes the image validity signal PVM to "0" to mask the image validity signal PV outputted from the memory read circuit 130a when the output signal of the selector 160 indicates "0". Note that the phase selectors 134b to 134d also have the same configuration as that of the phase selector 134a.

The synthesis circuit 138a is constituted of a selector 164. The selector 164 selects and outputs the image data from the synthesis circuit 138b when the image validity signal PVM outputted from the phase selector 134a indicates "0". The selector 164 selects and outputs the image data outputted from the memory read circuit 130a when the image validity signal PVM indicates "1". Note that the synthesis circuits 138b to 138d also have the same configuration as that of the synthesis circuit 138a.

Figure 7:
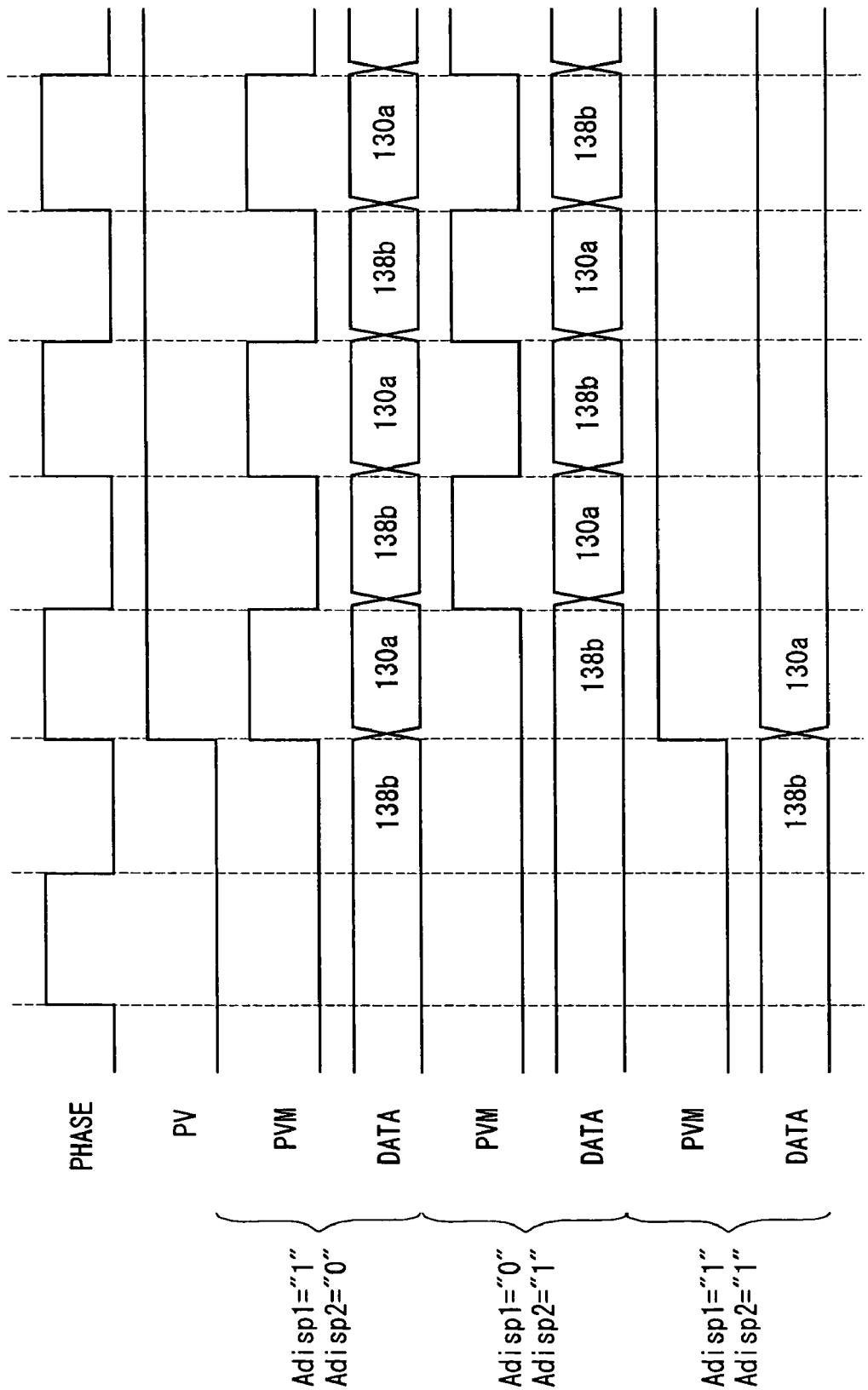
FIG. 7 is a timing chart showing the operation of the phase selector and the synthesis circuit in FIG. 2.

FIG. 7 shows the operation of the phase selector 134a and the synthesis circuit 138a. When the destination signals Adisp1, Adisp2 indicate "1" and "0" respectively (i.e., when the display device 118 is specified as the display destination of the image data outputted from the memory read circuit 130a), the phase selector 134a fixes the image validity signal PVM to "0" to mask the image validity signal PV outputted from the memory read circuit 130a during a period in which the phase signal PHASE indicates "0". When, on the other hand, the phase signal PHASE indicates "1", the image validity signal PV is not masked. Therefore, only when the phase signal PHASE indicates "1", the image validity signal PVM is at "1" and the synthesis circuit 138a outputs the image data outputted from the memory read circuit 130a as synthesized image data DATA.

When the destination signals Adisp1, Adisp2 indicate "0" and "1" respectively (i.e., when the display device 120 is specified as the display destination of the image data outputted from the memory read circuit 130a), the phase selector 134a fixes the image validity signal PVM to "0" to mask the image validity signal PV outputted from the memory read circuit 130a during a period in which the phase signal PHASE indicates "1". When, on the other hand, the phase signal PHASE indicates "0", the image validity signal PV is not masked. Therefore, only when the phase signal PHASE indicates "0", the image validity signal PVM is at "1" and the synthesis circuit 138a outputs the image data outputted from the memory read circuit 130a as the synthesized image data DATA.

When the destination signals Adisp1, Adisp2 both indicate "1" (i.e., the display devices 118, 120 are both specified as the display destinations of the image data outputted from the memory read circuit 130a), the phase selector 134a does not mask the image validity signal PV outputted from the memory read circuit 130a but outputs it as the image validity signal PVM. Therefore, irrespective of a signal value of the phase signal PHASE, the image validity signal PVM has "1" and the synthesis circuit 138a outputs the image data outputted from the memory read circuit 130a as the synthesized image data DATA.

In FIG. 2, the separator 116 has output registers 140, 142. The output register 140 accepts the image data outputted from the synthesis circuit 138a of the graphics LSI 110, in synchronization with rising edges of the clock DCLKddr outputted from the clock generator 122 and outputs it to the display device 118. The output register 142 accepts the image data outputted from the synthesis circuit 138a, in synchronization with falling edges of the clock DCLKddr outputted from the clock generator 122 and outputs it to the display device 120.

Figure 8:
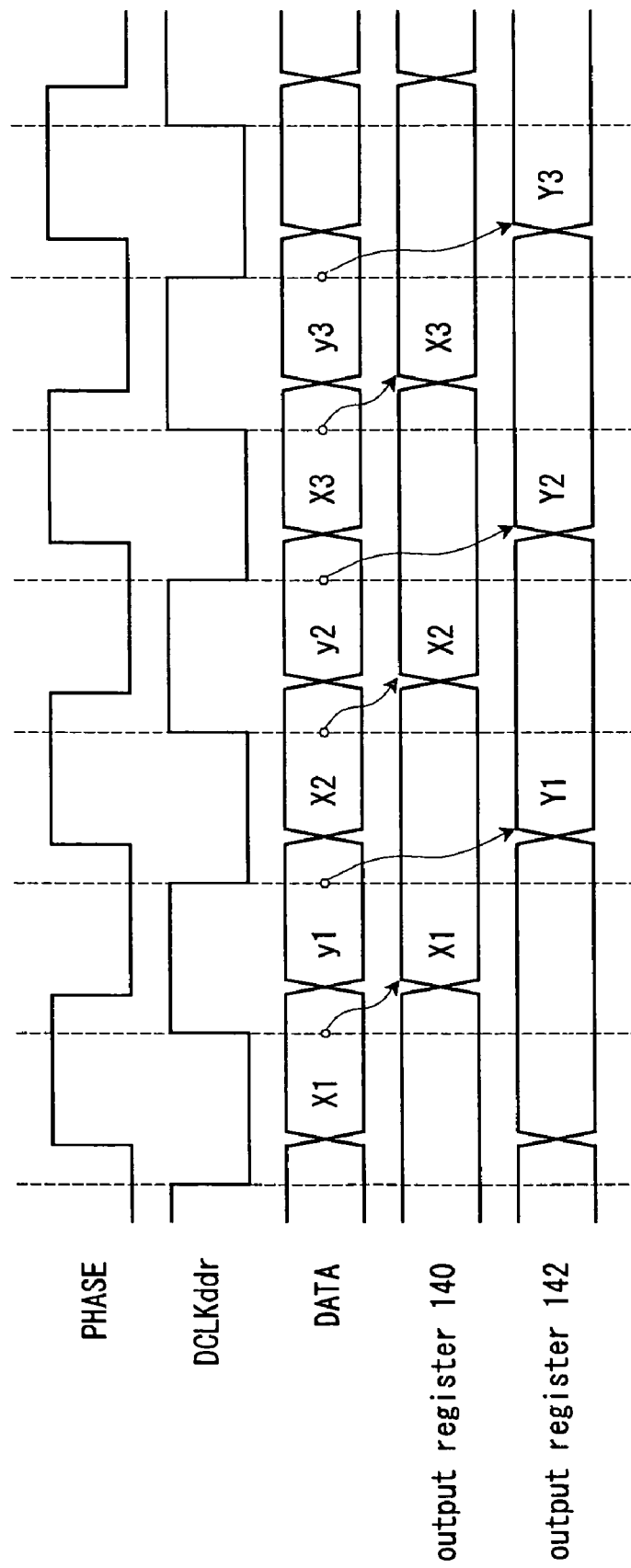
FIG. 8 is a timing chart showing the operation of the separator in FIG. 2.

FIG. 8 shows the operation of the separator 116. The output register 140 accepts the image data DATA outputted from the synthesis circuit 138a, in synchronization with the rising edges of the clock DCLKddr. Therefore, the output register 140 accepts in sequence the image data DATA that is outputted from the synthesis circuit 138a when the phase signal PHASE indicates "1", namely, the image data DATA of data values X1 to X3, and then outputs it to the display device 118. The output register 142 accepts the image data DATA outputted from the synthesis circuit 138a, in synchronization with the falling edges of the clock DCLKddr. Therefore, the output register 142 accepts in sequence the synthesized image data DATA that is outputted from the synthesis circuit 138a when the phase signal PHASE indicates "0", namely, the image DATA of data values Y1 to Y3, and outputs it to the display device 120.

Figure 9:
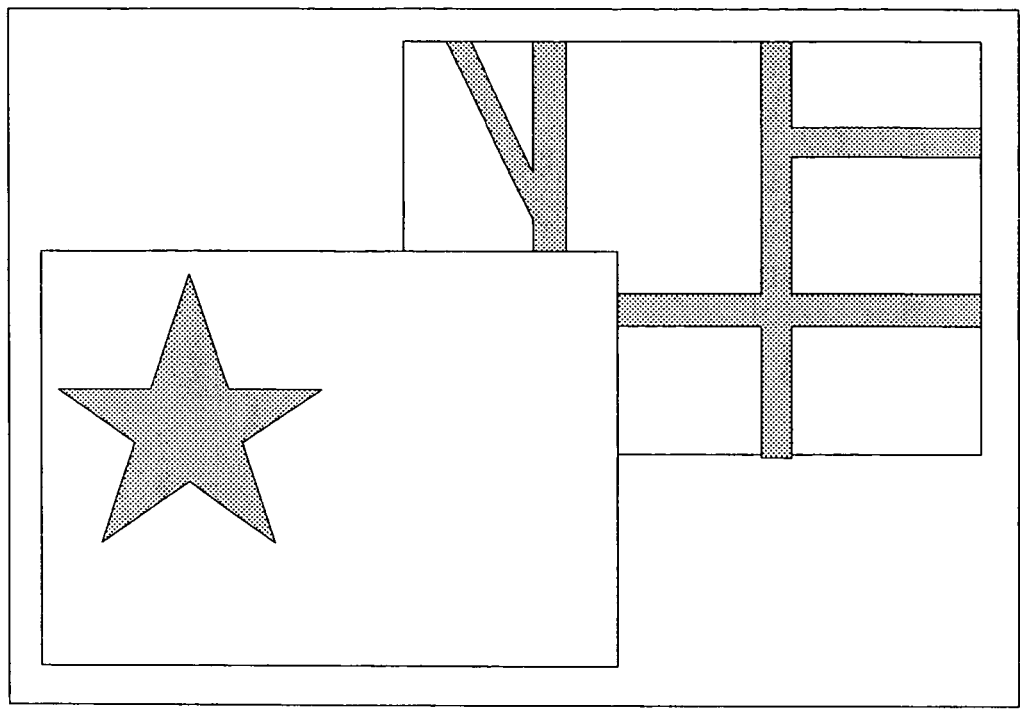
FIGS. 9(a), (b) show examples of image display on an image display system in FIG. 1.
Figure 9:
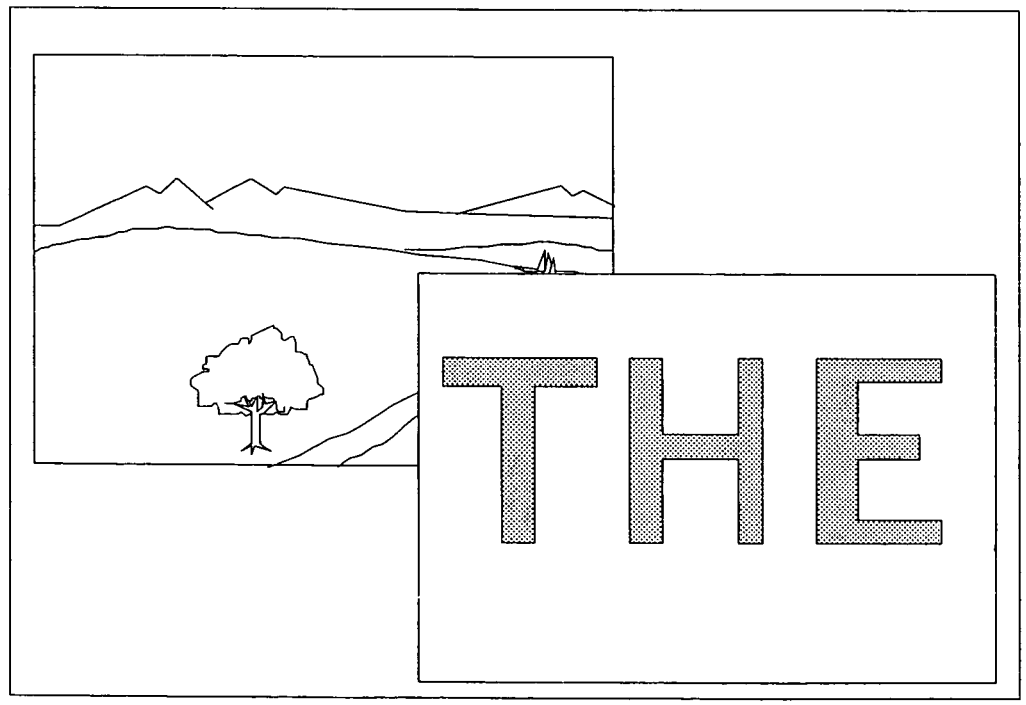

FIGS. 9(a), (b) show examples of image display on the image display system 100 in FIG. 1. The examples show images when the destination register 126 sets the bits Adisp1, Adisp2 corresponding to the area A of the graphics memory 114 to "0" and "1" respectively, the bits Bdisp1, Bdisp2 corresponding to the area B to "0" and "1" respectively, the bits Cdisp1, Cdisp2 corresponding to the area C to "1" and "0" respectively, and the bits Ddisp1, Ddisp2 corresponding to the area D to "1" and "0" respectively. In other words, the image data in the areas A, B shown in FIGS. 3(a), (b) are displayed only on the display device 120 and the image data in the areas C, D shown in FIGS. 3(c), (d) are displayed only on the display device 118.

Figure 10:
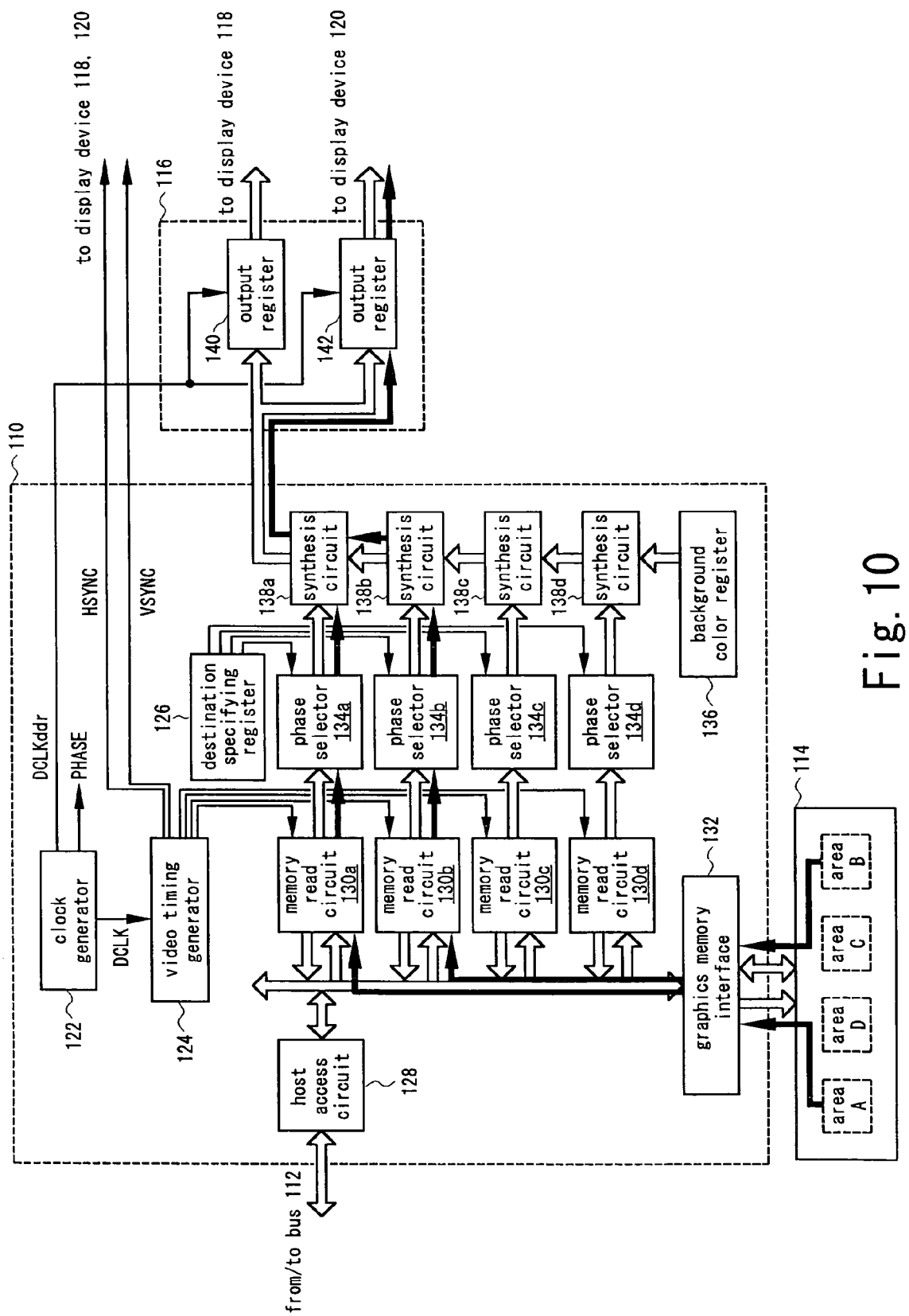
FIG. 10 shows data flow corresponding to the examples of image display in FIGS. 9(a), (b)

For such image display, the image data in the area A of the graphics memory 114 is supplied to the synthesis circuit 138a via the memory read circuit 130a and the phase selector 134a as indicated by the heavy line arrows in FIG. 10. The image data in the area B of the graphics memory 114 is supplied to the synthesis circuit 138b via the memory read circuit 130b and the phase selector 134b. Then, when the phase signal PHASE outputted from the clock generator 122 indicates "0", the image data in the areas A, B of the graphics memory 114 are synthesized by the synthesis circuits 138a, 138b and accepted by the output register 142 of the separator 116 for output to the display device 120.

Figure 11:
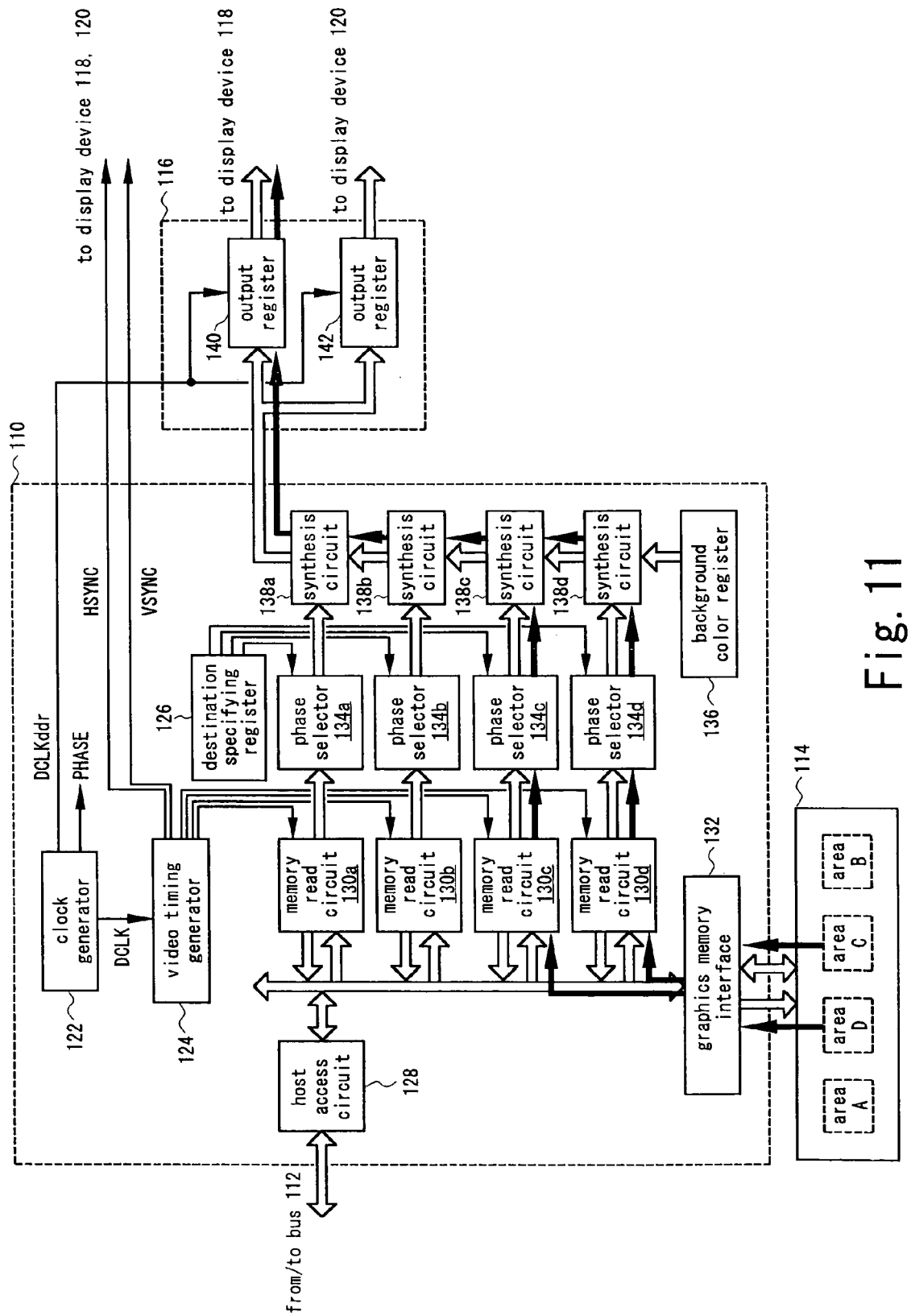
FIG. 11 shows data flow corresponding to the examples of image display in FIGS. 9(a), (b)

Further, as indicated by the heavy line arrows in FIG. 11, the image data in the area C of the graphics memory 114 is supplied to the synthesis circuit 138c via the memory read circuit 130c and the phase selector 134c. The image data in the area D of the graphics memory 114 is supplied to the synthesis circuit 138d via the memory read circuit 130d and the phase selector 134d. Then, when the phase signal PHASE indicates "1", the image data in the areas C, D of the graphics memory 114 are synthesized by the synthesis circuits 138c, 138d and accepted by the output register 140 of the separator 116 for output to the display device 118.

Figure 12:
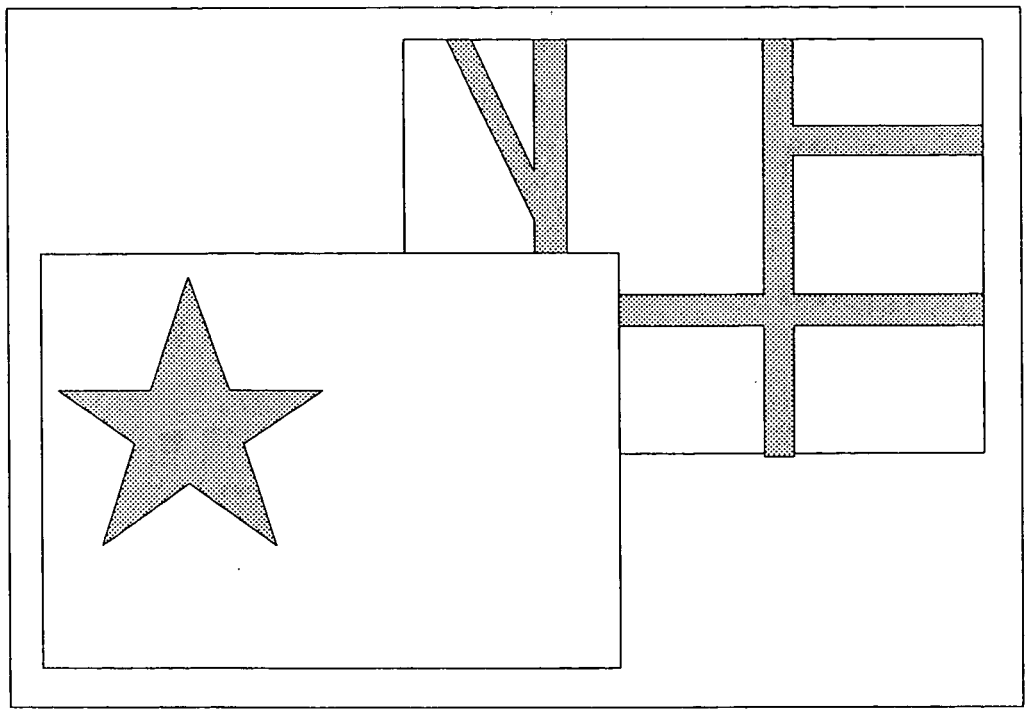
FIGS. 12(a), (b) show other examples of image display on the image display system in FIG. 1.
Figure 12:
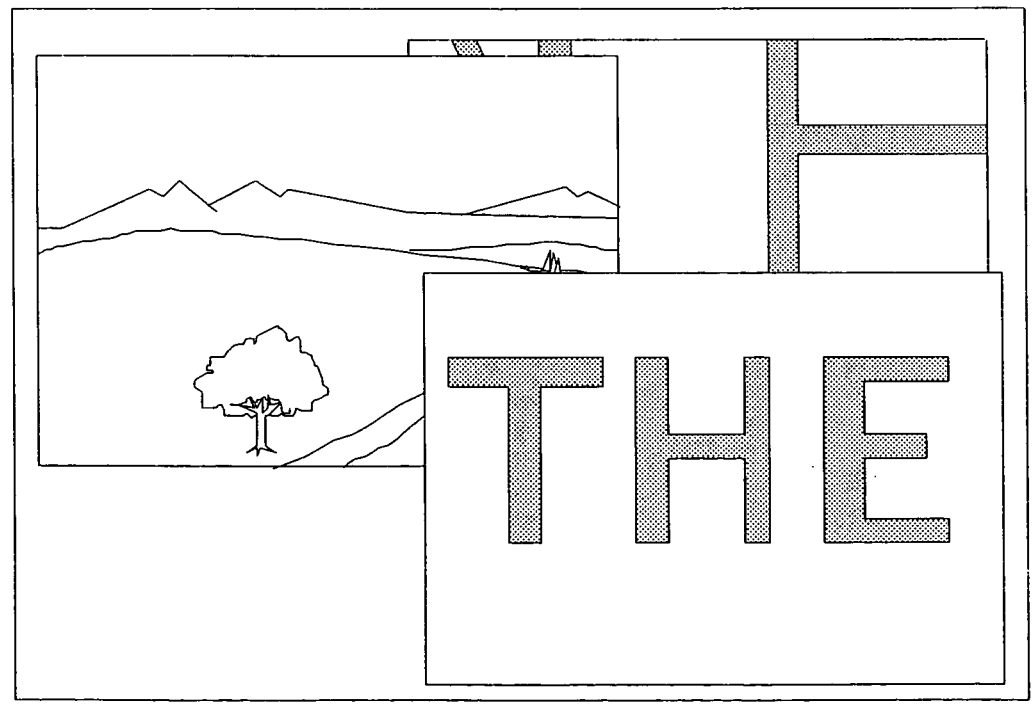

FIGS. 12(a), (b) show other examples of image display on the image display system 100 in FIG. 1. The examples show images when the destination register 126 sets the bits Adisp1, Adisp2 corresponding to the area A of the graphics memory 114 to "0" and "1" respectively, the bits Bdisp1, Bdisp2 corresponding to the area B to "0" and "1" respectively, the bits Cdisp1, Cdisp2 corresponding to the area C to "1" and "0" respectively, and the bits Ddisp1, Ddisp2 corresponding to the area D to "1" and "1" respectively. In other words, the image data in the areas A, B shown in FIGS. 3(a), (b) are displayed only on the display device 120, the image data in the area C shown in FIG. 3(c) is displayed only on the display device 118, and the image data in the area D shown in FIG. 3(d) is displayed both on the display devices 118, 120.

Figure 13:
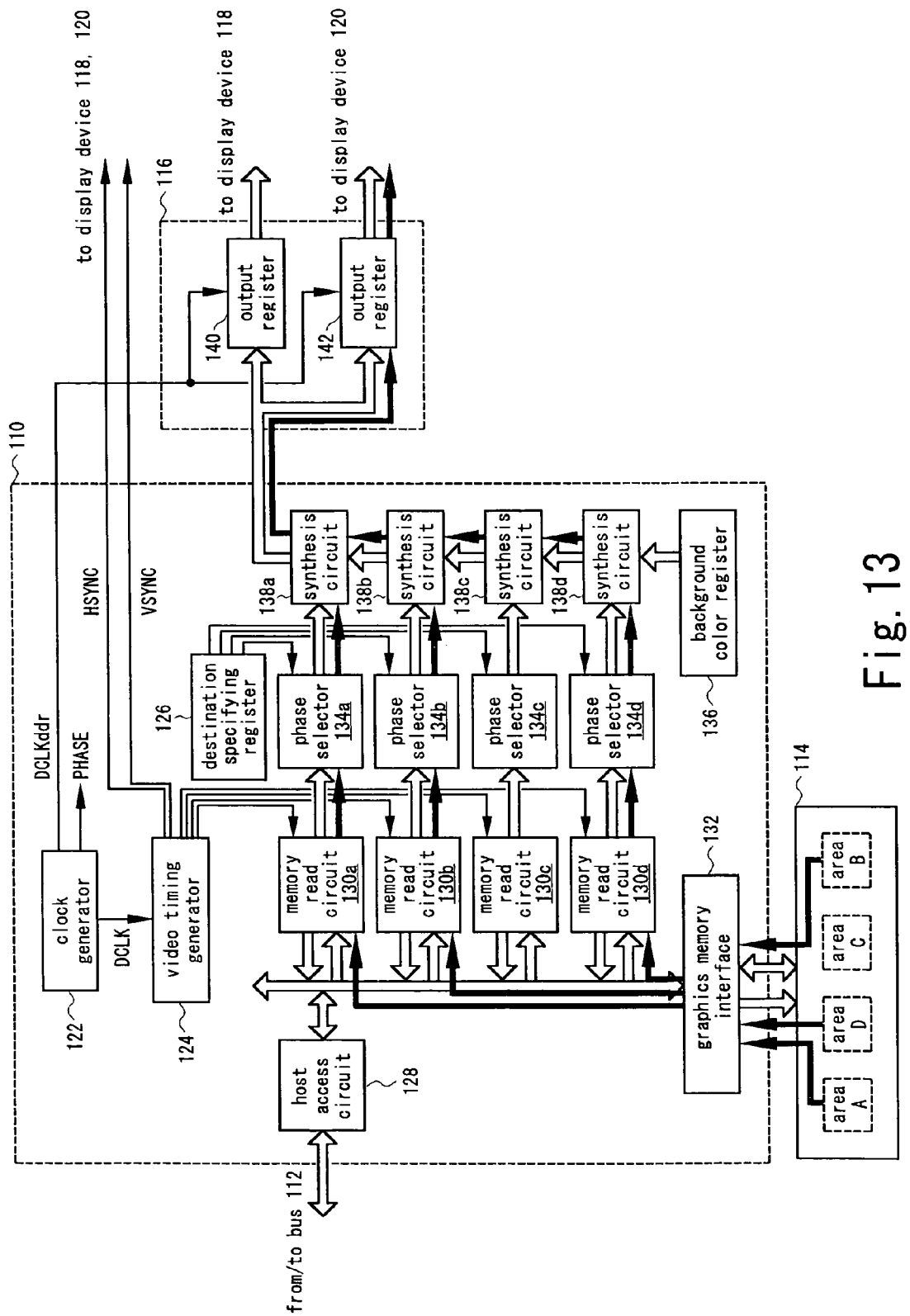
FIG. 13 shows data flow corresponding to the examples of image display in FIGS. 12(a), (b)

For such image display, the image data in the area A of the graphics memory 114 is supplied to the synthesis circuit 138a via the memory read circuit 130a and the phase selector 134a as indicated by the heavy line arrows in FIG. 13. The image data in the area B of the graphics memory 114 is supplied to the synthesis circuit 138b via the memory read circuit 130b and the phase selector 134b. The image data in the area D of the graphics memory 114 is supplied to the synthesis circuit 138d via the memory read circuit 130d and the phase selector 134d. Then, when the phase signal PHASE outputted from the clock generator 122 indicates "0", the image data in the areas A, B, D of the graphics memory 114 are synthesized by the synthesis circuits 138a, 138b, 138d and accepted by the output register 142 of the separator 116 for output to the display device 120. Further, similarly to the data flow (FIG. 11) corresponding to the examples of image display in FIGS. 9(a), (b), the image data in the area C of the graphics memory 114 is supplied to the synthesis circuit 138c via the memory read circuit 130c and the phase selector 134c. Then, when the phase signal PHASE indicates "1", the image data in the areas C, D of the graphics memory 114 are synthesized by the synthesis circuits 138c, 138d and accepted by the output register 140 of the separator 116 for output to the display device 118.

In the image display system 100 as configured above, the image data to be displayed on the display device 118 and the image data to be displayed on the display device 120 are separately multiplexed in each display period for one pixel on the display devices 118, 120 by synthesizing, for each level of the phase signal PHASE, the image data from the memory read circuits 130a to 130d in accordance with the setting of the destination specifying register 126. Therefore, the image display system 100 need not include two sets of the circuit for image data read from the graphics memory 114, the circuit for synthesizing the read image data (graphics LSIs), and the graphics memories 114, in association with the two display devices 118, 120. As a result, the display devices 118, 120 can display thereon different images without any increase in the scale of the image display system 100. This results in the reduction in manufacturing cost of the image display system 100.

Further, the image data to be displayed on each of the display devices 118, 120 are separately outputted for each level of the phase signal PHASE within the display period for one pixel on the display devices 118, 120, so that it is easy to separate the image data outputted from the synthesis circuit 138a for display on each of the display devices 118, 120. Moreover, it is able to output the image data to be displayed on each of the display devices 18, 120 without any increase in the number of output terminals for the image data because the graphics LSI 110 multiplexes the image data. This consequently contributes to the reduction in the manufacturing cost of the image display system 100.

Figure 14:
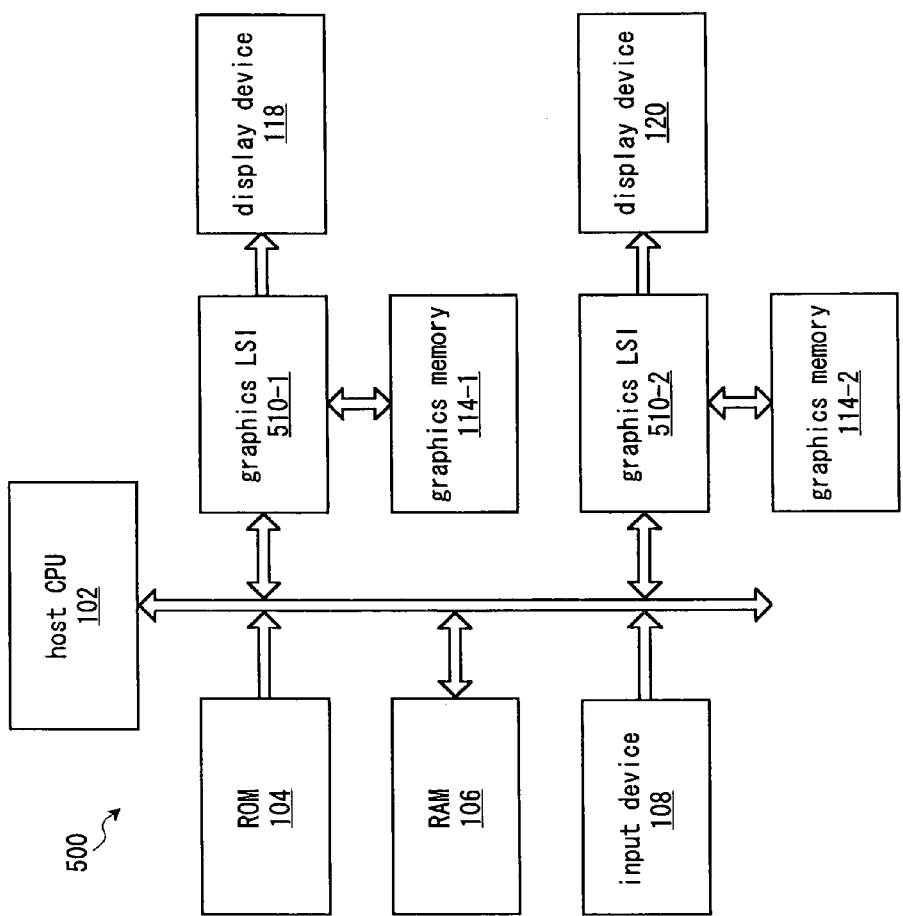
FIG. 14 is a block diagram showing an image display system using conventional image processing devices.

On the contrary, in case of displaying different images on the display devices 118, 120 in the conventional image processing device (graphics LSI), two sets of graphics LSIs 510-1, 510-2 and graphics memories 114-1, 114-2 are needed for the display devices 118, 120, as shown in FIG. 14. This greatly increases the scale of an image display system 500 as well as the manufacturing cost thereof.

According to the first embodiment as described above, it is able to display different images on the display devices 118, 120 without any increase in system scale of the image display system 100, thereby reducing the manufacturing cost of the image display system 100. In addition, the image data outputted from the synthesis circuit 138a can be easily separated for display on each of the display devices 118, 120. Further, the graphics LSI 110 can output image data to be displayed on each of the display devices 118, 120 without any increase in the number of output terminals for image data. This can contribute to the reduction in the manufacturing cost of the image display system 100.

Figure 15:
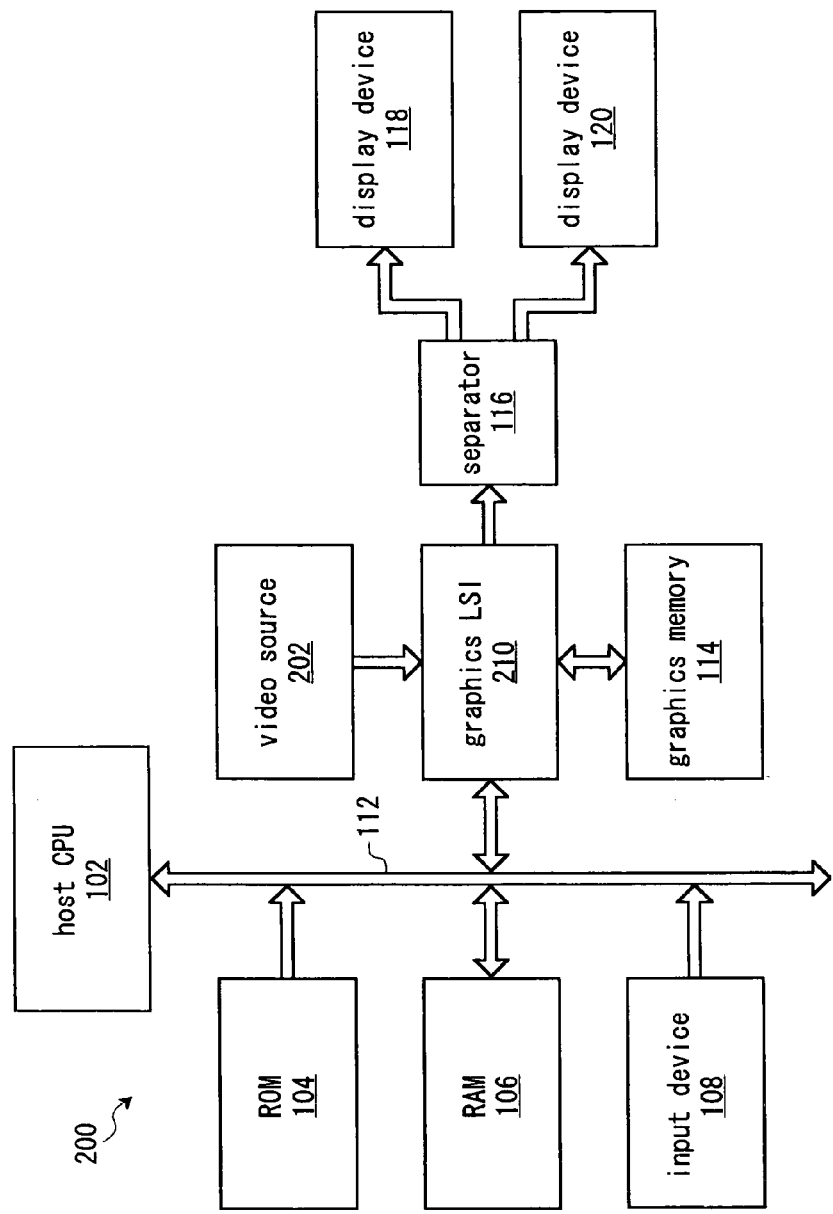
FIG. 15 is a block diagram showing a second embodiment of the present invention.

FIG. 15 shows a second embodiment of the present invention. In the description of the second embodiment, the same reference numerals and symbols are used to designate the same elements as the elements described in the first embodiment and the detailed description thereof will not be given. An image display system 200 is constituted of the image display system 100 (FIG. 1) of the first embodiment plus a video source 202 (video image supply unit). It has a graphics LSI 210 in place of the graphics LSI 110 of the first embodiment. The video source 202 sequentially outputs to the graphics LSI 210 image data to form a video image such as a DVD playback image.

Figure 16:
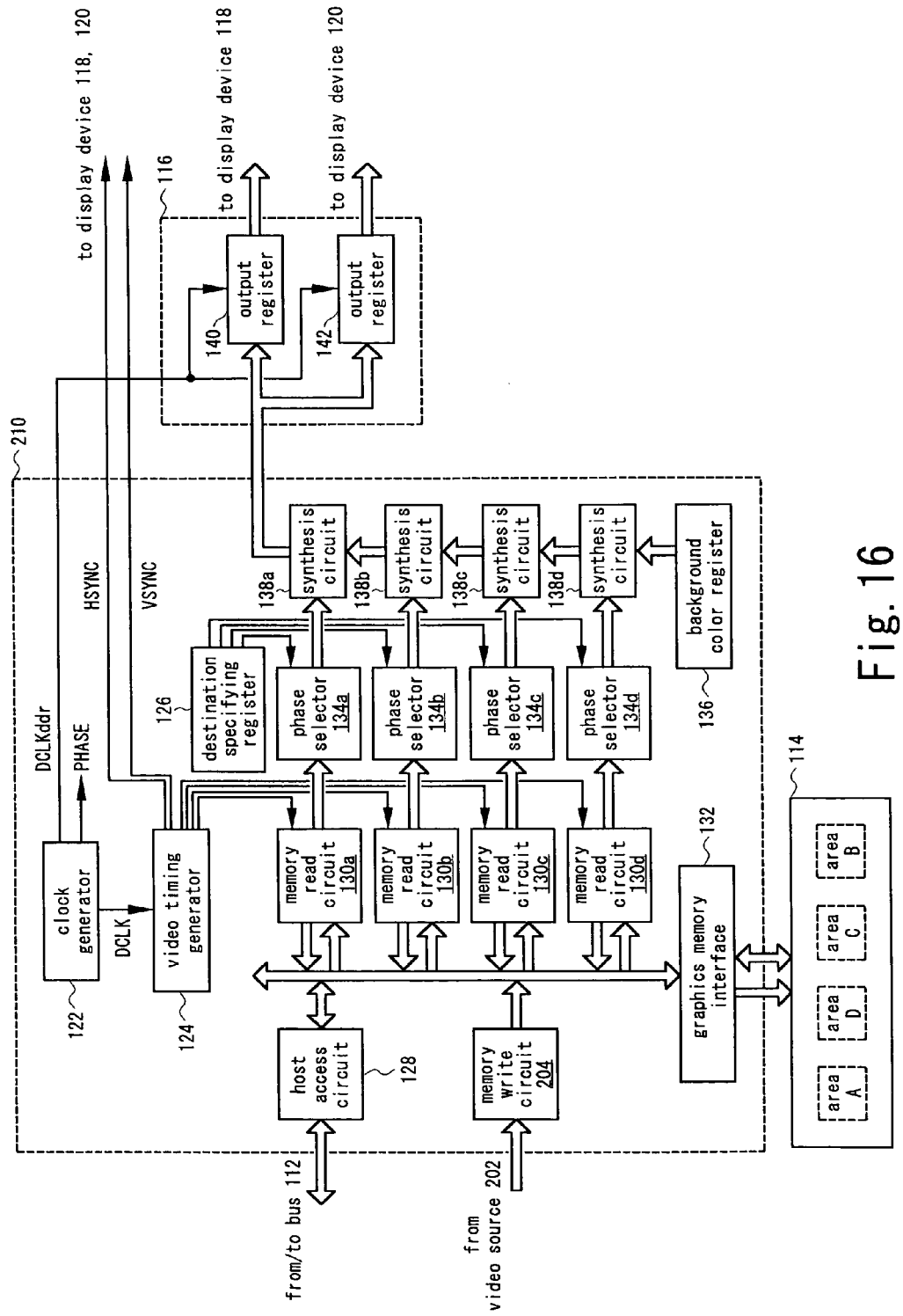
FIG. 16 is a block diagram showing a graphics LSI and a separator in FIG. 15.

FIG. 16 shows the graphics LSI 210 and a separator 116 in FIG. 15. The graphics LSI 210 is constituted of the graphics LSI 110 (FIG. 2) of the first embodiment plus a memory write circuit 204 (write unit). The memory write circuit 204 continuously writes to the graphics LSI 114 (for example, an area B) the image data sequentially outputted from the video source 202.

Figure 17:
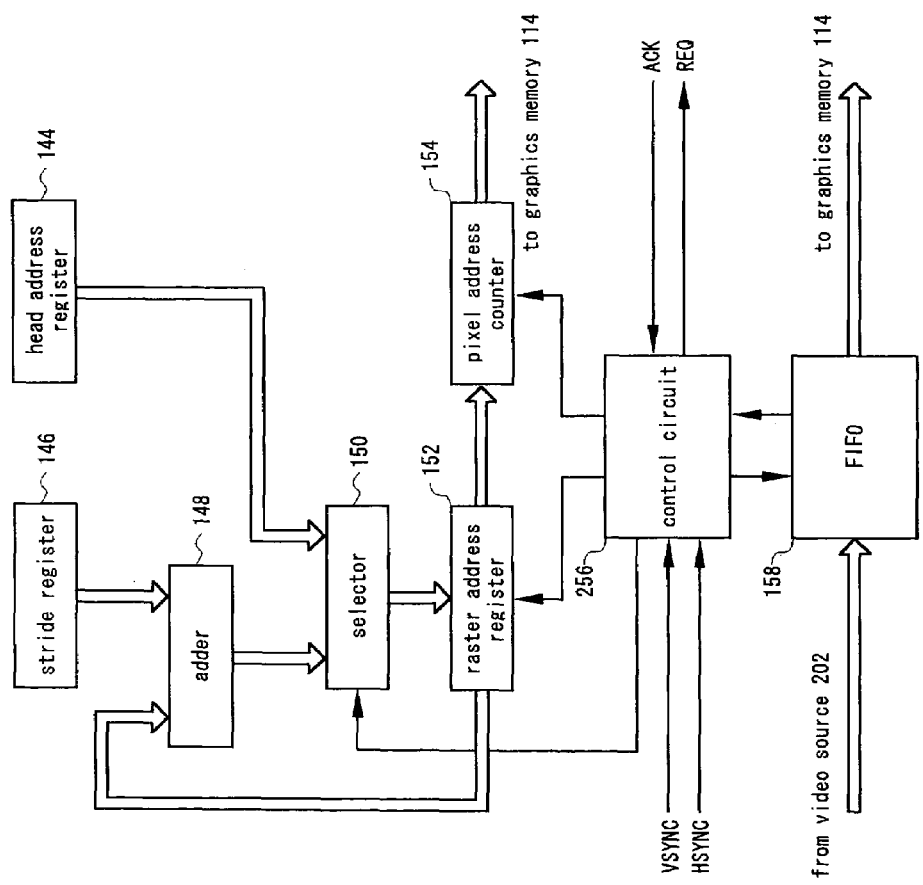
FIG. 17 is a block diagram showing a memory write circuit in FIG. 16.

FIG. 17 shows the memory write circuit 204 in FIG. 16. The memory write circuit 204 is the same as the memory read circuits 130a to 130d except that it has a control circuit 256 in place of the control circuit 156 (FIG. 5) of the first embodiment. The control circuit 256 outputs an access request signal REQ to a graphics memory interface 132 according to a vertical synchronizing signal VSYNC and a horizontal synchronizing signal HSYNC outputted from the video source 202 shown in FIG. 15, and to the state of a FIFO 158. It receives an access acknowledgement signal ACK as a response therefrom. Further, the control circuit 256 controls a selector 150, a raster address register 152, and a pixel address counter 154 similarly to the control circuit 156 of the first embodiment. The memory write circuit 204 continuously writes to the graphics memory 114 the image data sequentially outputted from the video source 202, so that the video images can be displayed on the display devices 118, 120.

In the second embodiment described above, the same effects as those of the first embodiment are also obtainable. In addition, when it is applied to, for example, a car navigation system having the display device 118 on a driver's seat side of a car and the display device 120 on a rear seat side, it is possible to display images relating to route guidance on the display device 118 on the driver's seat side and display video images such as DVD playback images and images received from television broadcast on the display device 120 on the rear seat side.

Figure 18:
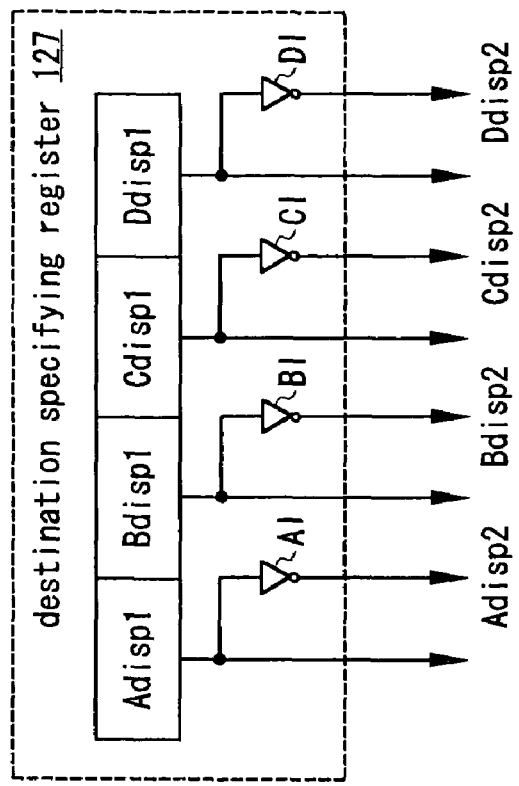
FIG. 18 is a diagram showing a modification example of the destination specifying register in FIG. 4.

The first and second embodiments have described, as a way of example, the destination register 126 constituted of 8 bits (Adisp1, Adisp2, Bdisp1, Bdisp2, Cdisp1, Cdisp2, Ddisp1, Ddisp2). However, the present invention is not limited thereto. For example, when image data stored in the graphics memory 114 need not be displayed on both of the display devices 118, 120, a destination specifying register 127 may be provided only with 4 bits (Adisp1, Bdisp1, Cdisp1, Ddisp1) as in shown in FIG. 18, outputting their respective bit values as destination signals Adisp1, Bdisp1, Cdisp1, Ddisp1, or outputting them as destination signals Adisp2, Bdisp2, Cdisp2, Ddisp2 via inverters AI, BI, CI, DI respectively. Structuring a register as above makes it possible to halve the number of bits compared with that in the destination specifying register 126, enabling the reduction in the circuit scale of the destination specifying register.

The first and second embodiments have described the examples in which the present invention is applied to an image display system having two display devices. However, the present invention is not limited thereto. For example, the present invention may be applied to an image display system having three or more display devices.

The first and second embodiments have also described the examples in which the graphics LSI and the separator are formed independently. However, the present invention is not limited thereto. For example, a graphics LSI and a separator may be formed as one chip.

The invention is not limited to the above embodiments and various modifications may be made without departing from the spirit and scope of the invention. Any improvement may be made in part or all of the components.

What is claimed is:

1. An image display system comprising:
a plurality N of image display units;
an image storing unit storing therein a plurality of pieces of image data;
a read unit reading the plurality of pieces of image data from said image storing unit for output;
a destination specifying unit specifying an image display unit to be a display destination of each of the plurality of pieces of image data from said read unit;
a divided-period setting unit dividing a unit display period of said image display units to N divided periods to correspond to said image display units, respectively;
a synthesis unit that synthesizes, for sequential outputs, in each of the divided periods, the image data from said read unit according to the display destination specified by said destination specifying unit in order to multiplex image data to be displayed on each of said image display units; and
a separating unit separating, in each of the divided periods of the unit display period, image data outputted from the synthesis unit and outputting the separated image data to the respective image display units corresponding to the divided periods,
wherein said read unit has a plurality of read circuits which correspond to the plurality of pieces of image data, respectively, and each read a corresponding piece of image data to output the read niece together with an image validity signal indicating validity/invalidity of the image data.

2. The image display system according to claim 1, wherein:
said destination specifying unit outputs a destination signal for each of the plurality of pieces of image data from said plurality of read circuits, the destination signal indicating an image display unit to be the display destination.

3. The image display system according to claim 2, wherein said destination specifying unit has, for each of the plurality of pieces of image data from said plurality of read circuits, N bits in association with the respective image display units, and outputs each bit value of the N bits as the destination signal.

4. The image display system according to claim 2, wherein:
said N is 2; and
said destination specifying unit has, for each of the plurality of pieces of image data from said plurality of read circuits, a bit in association with one of two image display units and outputs a bit value and an inverse value of the bit as the destination signal.

5. The image display system according to claim 1, further comprising:
a video image supply unit sequentially outputting image data to form a video image; and
a write unit writing to said image storing unit the image data sequentially outputted from said video image supply unit.

6. An image processing device comprising:
a read unit reading a plurality of pieces of image data from an image storing unit for output;
a destination specifying unit specifying, from a plurality N of image display units, an image display unit to be a display destination of each of the plurality of pieces of image data from said read unit;
a divided-period setting unit dividing a unit display period of said image display units to N divided periods to correspond to said image display units, respectively; and
a synthesis unit that synthesizes, for sequential outputs, in each of the divided periods, the image data from said read unit according to the display destination specified by said destination specifying unit in order to multiplex image data to be displayed on each of said image display units,
wherein said read unit has a plurality of read circuits which correspond to the plurality of pieces of image data, respectively, and each read a corresponding piece of image data to output the read piece together with an image validity signal indicating validity/invalidity of the image data.

7. The image processing device according to claim 6, wherein:
said destination specifying unit outputs a destination signal for each of the plurality of pieces of image data from said plurality of read circuits, the destination signal indicating an image display unit to be the display destination.

8. The image processing device according to claim 7, wherein said destination specifying unit has, for each of the plurality of pieces of image data from said plurality of read circuits, N bits in association with the respective image display units, and outputs each bit value of the N bits as the destination signal.

9. The image processing device according to claim 7, wherein:
said N is 2; and
said destination specifying unit has, for each of the plurality of pieces of image data from said plurality of read circuits, a bit in association with one of two image display units and outputs a bit value and an inverse value of the bit as the destination signal.

10. The image processing device according to claim 6, further comprising:
a write unit writing to said image storing unit image data to form a video image, the image data being sequentially outputted from a video image supply unit.

11. The image display system according to claim 2, wherein:
said divided-period setting unit outputs a divided-period signal indicating a current divided period.

12. The image display system according to claim 11, wherein:

said synthesis unit comprises a plurality of mask circuits corresponding to said plurality of read circuits, respectively, and each masking the image validity signal from a corresponding read circuit during a period according to a corresponding destination signal and the divided-period signal, the period being a period excluding a divided period corresponding to an image display unit to display image data from a corresponding read circuit.

13. The image display system according to claim 12, wherein:
said synthesis unit further comprises a plurality of synthesis circuits connected in series and corresponding to said plurality of mask circuits, respectively, and each selecting and outputting image data outputted from a corresponding read circuit when the image validity signal masked by a corresponding mask circuit indicates validity, while selecting and outputting image data outputted from a preceding stage when the image validity signal masked by the corresponding mask circuit indicates invalidity.

14. The image processing device according to claim 7, wherein:
said divided-period setting unit outputs a divided-period signal indicating a current divided period.

15. The image processing device according to claim 14, wherein:
said synthesis unit comprises a plurality of mask circuits corresponding to said plurality of read circuits, respectively, and each masking the image validity signal from a corresponding read circuit during a period according to a corresponding destination signal and the divided-period signal, the period being a period excluding a divided period corresponding to an image display unit to display image data from a corresponding read circuit.

16. The image processing device according to claim 15, wherein:
said synthesis unit further comprises a plurality of synthesis circuits connected in series and corresponding to said plurality of mask circuits, respectively, and each selecting and outputting image data outputted from a corresponding read circuit when the image validity signal masked by a corresponding mask circuit indicates validity, while selecting and outputting image data outputted from a preceding stage when the image validity signal masked by the corresponding mask circuit indicates invalidity.

* * * * *

(12) EX PARTE REEXAMINATION CERTIFICATE (9074th)
United States Patent
Komagata

(10) Number: US 7,663,660 C1
(45) Certificate Issued: Jun. 12, 2012

(54) IMAGE DISPLAY SYSTEM AND IMAGE PROCESSING DEVICE

(75) Inventor: Yoshinobu Komagata, Kawasaki (JP)

(73) Assignee: Fujitsu Semiconductor Limited, Yokohama-Shi, Kanagawa (JP)

Reexamination Request:
No. 90/011,866, Aug. 17, 2011

Reexamination Certificate for:
Patent No.: 7,663,660
Issued: Feb. 16, 2010
Appl. No.: 10/975,820
Filed: Oct. 29, 2004

(30) Foreign Application Priority Data

Jun. 18, 2004 (JP) .......................... 2004181173

(51) Int. Cl.
*H04N 13/00* (2006.01)
*G06T 15/20* (2006.01)

(52) U.S. Cl. .......................... 348/42; 345/427
(58) Field of Classification Search .................. None
See application file for complete search history.

(56) References Cited

To view the complete listing of prior art documents cited during the proceeding for Reexamination Control Number 90/011,866, please refer to the USPTO's public Patent Application Information Retrieval (PAIR) system under the Display References tab.

*Primary Examiner* — Henry N Tran

(57) ABSTRACT

A read unit reads a plurality of pieces of image data from an image storing unit for output, respectively. A destination specifying unit specifies image display units to be display destinations of the image data from the read unit. A divided-period setting unit divides a unit display period of the image display units to a plurality (2) of divided periods to correspond to the image display units. In each divided period, a synthesis unit synthesizes, for sequential outputs, the image data from the read units according to the display destination specified by the destination specifying unit in order to multiplex the image data to be displayed on each of the image display units. A separating unit separates, in every divided period of the unit display period, the synthesized image data for output to the image display units corresponding to the respective divided periods.

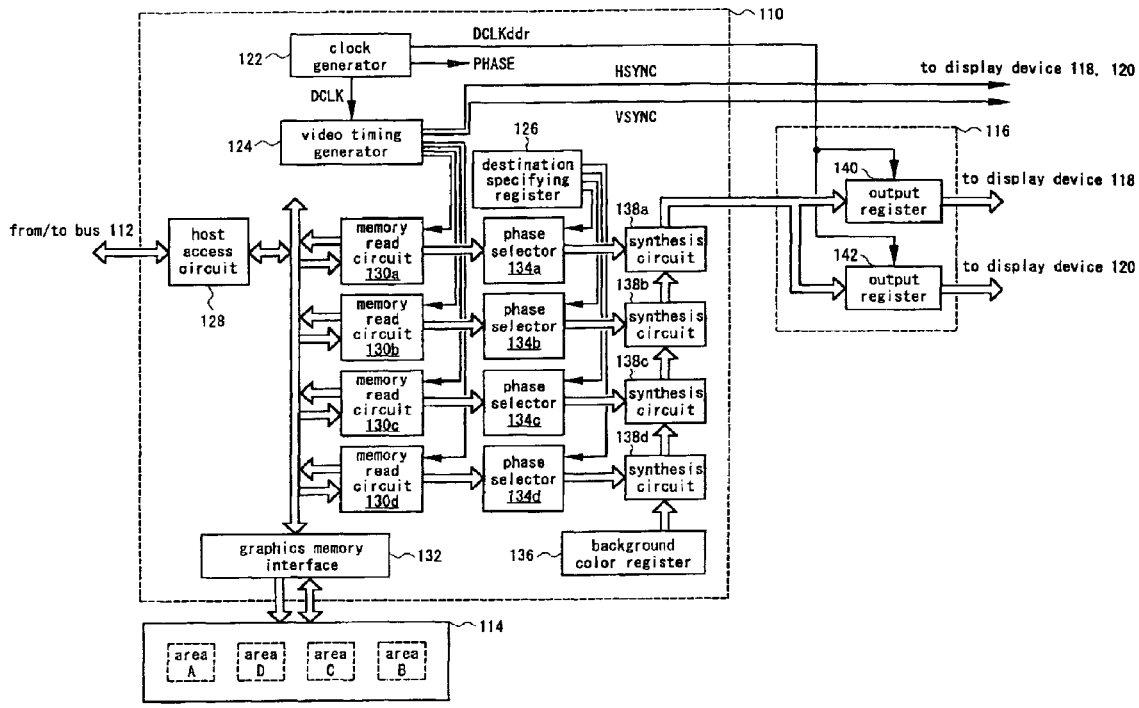

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6-16 is confirmed.

Claim 1 is determined to be patentable as amended.

Claims 2-5, dependent on an amended claim, are determined to be patentable.

1. An image display system comprising:
   a plurality N of image display units;
   an image storing unit storing therein a plurality of pieces of image data;
   a read unit reading the plurality of pieces of image data from said image storing unit for output;
   a destination specifying unit specifying an image display unit to be a display destination of each of the plurality of pieces of image data from said read unit;
   a divided-period setting unit dividing a unit display period of said image display units to N divided periods to correspond to said image display units, respectively;
   a synthesis unit that synthesizes, for sequential outputs, in each of the divided periods, the image data from said read unit according to the display destination specified by said destination specifying unit in order to multiplex image data to be displayed on each of said image display units; and
   a separating unit separating, in each of the divided periods of the unit display period, image data outputted from the synthesis unit and outputting the separated image data to the respective image display units corresponding to the divided periods,
   wherein said read unit has a plurality of read circuits which correspond to the plurality of pieces of image data, respectively, and each read a corresponding piece of image data to output the read [niece] *piece* together with an image validity signal indicating validity/invalidity of the image data.

\* \* \* \* \*